(12) United States Patent
Jaffray

(10) Patent No.: US 10,001,570 B1
(45) Date of Patent: Jun. 19, 2018

(54) APPARATUS FOR HIGH RESOLUTION PET IMAGING

(71) Applicant: University Health Network, Toronto (CA)

(72) Inventor: David A. Jaffray, Etobicoke (CA)

(73) Assignee: UNIVERSITY HEALTH NETWORK, Toronto, Ontario (CA)

( * ) Notice: Subject to any disclaimer, the term of this patent is extended or adjusted under 35 U.S.C. 154(b) by 331 days.

(21) Appl. No.: 15/055,720

(22) Filed: Feb. 29, 2016

Related U.S. Application Data (60) Provisional application No. 62/121,546, filed on Feb. 27, 2015.

(51) Int. Cl.
*G01T 1/164* (2006.01)
*G01T 1/29* (2006.01)

(52) U.S. Cl.
CPC .................................. *G01T 1/2985* (2013.01)

(58) Field of Classification Search
CPC ................................ G01T 1/2985; A61B 6/02
USPC ....................................................... 250/363.03
See application file for complete search history.

(56) References Cited

U.S. PATENT DOCUMENTS

2016/0073976 A1* 3/2016 Moriyasu .............. G01T 1/2985
600/425

* cited by examiner

*Primary Examiner* — David Porta
*Assistant Examiner* — Meenakshi Sahu
(74) *Attorney, Agent, or Firm* — Norton Rose Fulbright Canada LLP; Maya Medeiros (57) ABSTRACT

An apparatus for high resolution positron emission tomography (PET) imaging. The apparatus includes at least a first detector and a second detector arranged to detect gamma rays traveling from a target area, the first detector and the second detector being a detector pair. There is at least one collimator for filtering gamma rays reaching the first and second detectors. The collimator defines respective passages filtering gamma rays reaching the respective first and second detectors, the passages being defined to filter for only gamma ray pairs traveling from the target area at a predetermined range of angles with respect to each other, the predetermined range of angles being in the range of $180°-\theta_E$, where $\theta_E$ is less than 1° and greater than 0°.

21 Claims, 10 Drawing Sheets

APPARATUS FOR HIGH RESOLUTION PET IMAGING

TECHNICAL FIELD

The present disclosure relates generally to positron emission tomography (PET) imaging, in particular apparatuses for high resolution PET imaging.

BACKGROUND

Positron emission tomography (PET) imaging may be used for non-invasive imaging. For example, PET imaging may be used as a diagnostic tool, to image tumors, and may be used in human patients as well as in animal models.

Current PET systems may have limited resolution, due to effects such as annihilation blurring. Such effects may limit the resolution of current PET imaging techniques to several millimeters. This relatively low resolution may limit the ability to obtain accurate and precise PET imaging of small structures, especially for small animal imaging.

BRIEF DESCRIPTION OF THE DRAWINGS

Reference will now be made to the drawings, which show by way of example embodiments of the present disclosure, and in which.

It will be noted that throughout the appended drawings, like features are identified by like reference numerals.

DETAILED DESCRIPTION

The present disclosure includes description of various examples and details, which are provided for the purpose of illustration only and are not intended to be limiting. Any theories or equations presented are provided to help in understanding only and the present disclosure is not bound by any such theories or equations.

Positron emission tomography (PET) imaging is a radiotracer imaging technique, in which a tracer compound labeled with positron-emitting radionuclides are injected into the imaging target. The tracer compound can then be used to track biochemical and physiological processes (e.g., in vivo). Tracer compounds that may be imaged include, for example, fluorine-18 (F-18), carbon-11 (C-11), nitrogen-13 (N-13), and oxygen-15 (O-15). A tracer compound that may be used in oncology is F-18-fluoro-deoxy-glucose (F-18-FDG).

The decay of the tracer compound results in emission of positrons, which annihilate on contact with electrons. Each annihilation produces two gamma rays traveling in substantially opposite directions. In PET imaging, these photons may be detected by detectors surrounding the imaging target. A coincident circuit may filter detection events from individual detectors so that two detection events unambiguously occurring within a certain time window (e.g., on the order of several nanoseconds) may be considered substantially simultaneous or coincident and thus be determined to have come from the same annihilation. Such "coincidence events" may be used to calculate spatial position of the annihilation events and thus the spatial position of the tracer compound.

Positrons may be emitted at a range of energies (e.g., up to 511 keV) and may travel a short distance (e.g., on the order of several millimeters) before annihilation. This distance traveled means that a detected annihilation event may in fact be spatially located a distance of several millimeters from the actual location of the tracer compound, which may give rise to "annihilation blurring" in the final PET image on the order of up to several millimeters.

In PET imaging, the two gamma rays produced by annihilation are typically assumed to be emitted in anti-parallel directions (i.e., traveling 180° apart). However, annihilation of high energy positrons (e.g., positrons at or very close to 511 keV), which would correspond to a shorter distance travelled than lower energy positrons, may result in the emission of gamma rays that are slightly less than 180° apart. The detected annihilation event would then be located a shorter distance from the actual location of the tracer compound thus reducing the 'annihilation blurring' effect in the final PET image.

Figure 1:
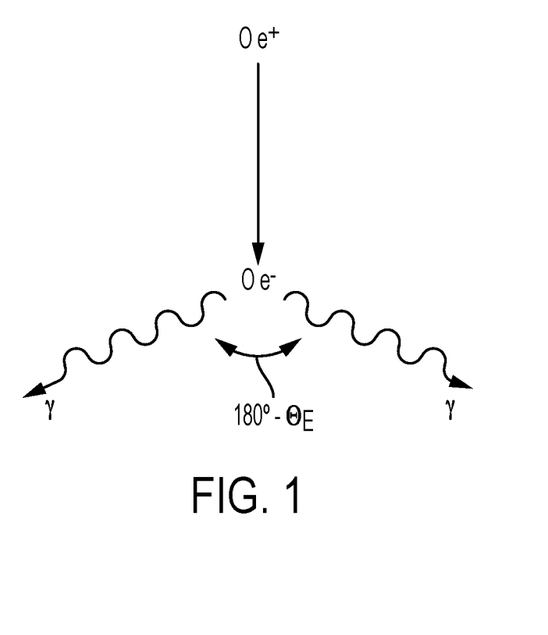
FIG. 1 is a schematic illustration of a positron annihilation event having a high energy of emission.

FIG. 1 schematically illustrates the annihilation of a high energy positron (e.g., at 511 keV). When the high energy positron $e^+$ is annihilated by an electron $e^-$, the result is the emission of two gamma rays γ that travel at an emission angle of $180°-\theta_E$ from each other. Typically, the higher the energy of the positron $e^+$, the larger the value of $\theta_E$. For positrons $e^+$ at low energies, $\theta_E$ approaches zero. For positrons at high energies, $\theta_E$ may be on the order of several tenths of a degree (e.g., about 0.05° to about 0.5°). In some embodiments, the emission angle may be determined during imaging when the detector is on.

Thus, the angle of emission of the gamma rays may provide an indication of the energy of the positron at annihilation. Emitted positrons lose energy as they travel from the site of emission, so the closer the annihilation is to the site of positron emission, the higher the energy of the positron at the moment of annihilation and consequently the larger the value of $\theta_E$. The angle of emission of the gamma rays may thus be an indicator of the proximity of the annihilation event to the actual site of positron emission. By selectively detecting coincidence events that correspond only to detection of gamma ray pairs having an emission angle in a defined range of angles (i.e., 180°-$\theta_E$), it may be possible to selectively detect annihilation events that are within a certain proximity to the site of positron emission. This may be useful to reduce or overcome annihilation blurring and may help to provide higher resolution PET imaging.

In general, an example apparatus for high resolution PET imaging may include gamma ray detectors and gamma ray collimators arranged to selectively detect gamma ray pairs having an emission angle in a defined range of angles (i.e., 180°-$\theta_E$). For example, a gamma ray detector may be any suitable detector used for PET imaging, for example an array of scintillators or crystals. For example, a gamma ray collimator may be any suitable collimator used for filtering gamma rays, for example a metal block having a passage that selectively allows only gamma rays traveling along the direction of the passage to pass through to reach the detecting surface of the detector. In some examples, a collimator may provide a single passage, thus filtering gamma rays for detection by a single detector. In other examples, a collimator may be configured for a plurality of detectors and have a respective plurality of passages for filtering gamma rays for detection by each of the plurality of detectors. In some examples, the collimator may filter for gamma rays traveling in a range of directions, which may include, for example, at or nearly head-on to the detecting surface of the detector, and at a defined range of angles to the detecting surface of the detector.

A coincidence event at a defined range of emission angles (i.e., 180°-$\theta_E$) may be detected between defined pairs of detectors. The detectors and respective collimator(s) may be configured to detect the coincidence event at the defined range of emission angles in various ways.

Figure 2A:
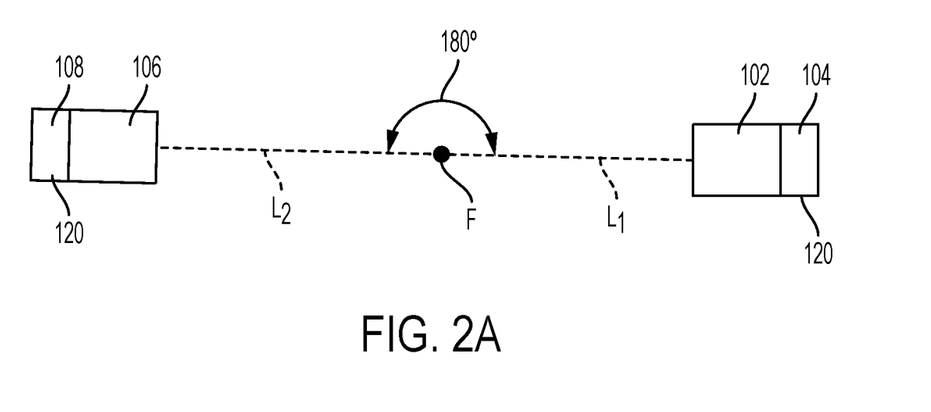
FIG. 2A is a schematic illustration of an example detector configuration that may be used in an apparatus for high resolution PET imaging.

FIG. 2A illustrates an example configuration of a detector pair and respective collimator(s) for detecting a coincidence event at a defined range of emission angles. In this example, a first detector 104 and a second detector 108 define a detector pair 120. Each detector 104, 108 are arranged on opposing sides of a target area F, and each detector 104, 108 defines a respective line-of-sight $l_1$, $l_2$ to the target area F. In this example, the angle between the lines-of-sight $l_1$, $l_2$ is substantially 180°. The first and second detectors 104, 108 have respective first and second collimators 102, 106 that filter gamma rays traveling towards the respective first and second detectors 104, 108. The collimators 102, 106 may be configured to filter for gamma ray pairs traveling at a predefined emission angle 180°-$\theta_E$. Although the collimators 102, 106 have been shown as separate collimators, a single collimator may be used instead.

Figure 2B:
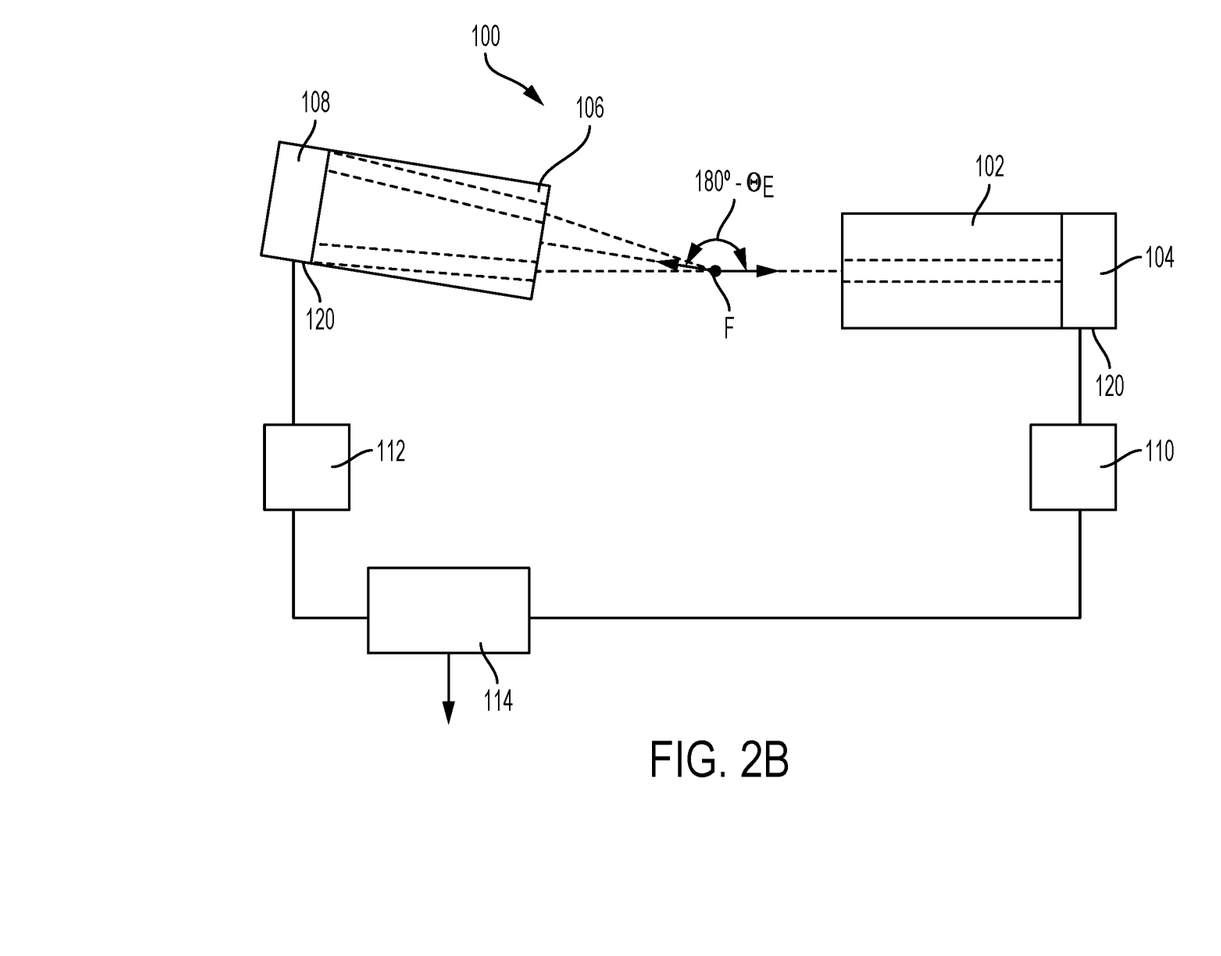
FIG. 2B is a schematic illustration of an example detector that may be used in an apparatus for high resolution PET imaging.

FIG. 2B schematically illustrates an example apparatus 100 for high resolution PET imaging, which may be based on the configuration described in FIG. 2A. The apparatus 100 may be used in place of or integrate with PET detectors.

Figure 2C:
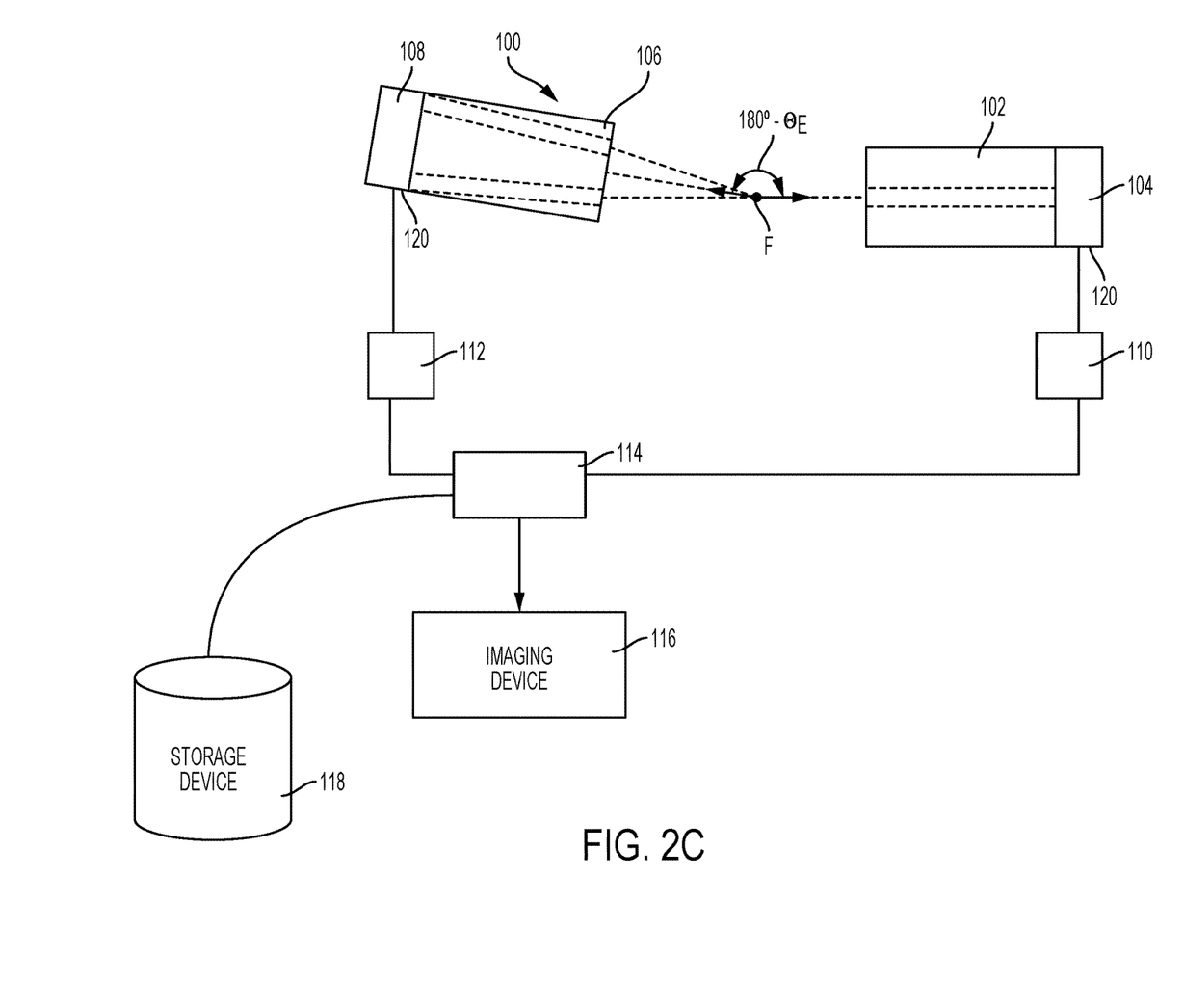
FIG. 2C is a schematic illustration of another example detector that may be used in an apparatus for high resolution PET imaging.

The apparatus 100 may include a first detector 104 and a second detector 108. The detectors 104, 108 may be positioned on substantially opposing sides of a target area F. The detectors 104, 108 may be PET detectors, for example scintillators using an array of crystals. Each of the detectors 104, 108 may have a respective first collimator 102 and second collimator 106, which provides the detectors 104, 108 with directional sensitivity. That is, the detectors 104, 108 will only detect gamma rays traveling towards the respective detectors 104, 108 at direction(s) filtered by the collimators 102, 106. The detectors 104, 108 and collimators 102, 106 may be together referred to as a detector pair 120. The detectors 104, 108 and collimators 102, 106 may be in a fixed relationship with respect to each other (e.g., fixed in place with a bridging structure, not shown) within the detector pair. The apparatus may further include first and second detection components 110, 112, which may include electronic components (e.g., circuit(s), processor(s) and/or memory(ies)) for tracking signals from the detectors 104, 108 representing detection events at the respective first and second detectors 104, 108. Signals from the detection components 110, 112 may be further transmitted to a coincidence component 114, which may include electronic components (e.g., circuit(s), processor(s) and/or memory(ies)) for determining coincidence events. The coincidence component 114 may further transmit signals representing determined coincidence events for further processing, for example to an imaging workstation, to produce a PET image. An example imaging system 116 (which may include an imaging workstation) is shown in FIG. 2C.

The first and second collimators 102, 106 may be configured to allow gamma ray pairs traveling within a predetermined range of emission angles to reach the respective first and second detectors 104, 108, filtering out all other gamma rays. In the example shown, the first and second collimators 102, 106 may be configured to allow only gamma rays traveling at a range of angles substantially equal to or close to 180°-$\theta_E$, where $\theta_E$ may be pre-selected (e.g., in the range of about 0.05° to about 0.5°) to correspond to annihilation of relatively high energy positrons (e.g., at or close to 511 keV).

Figure 3:
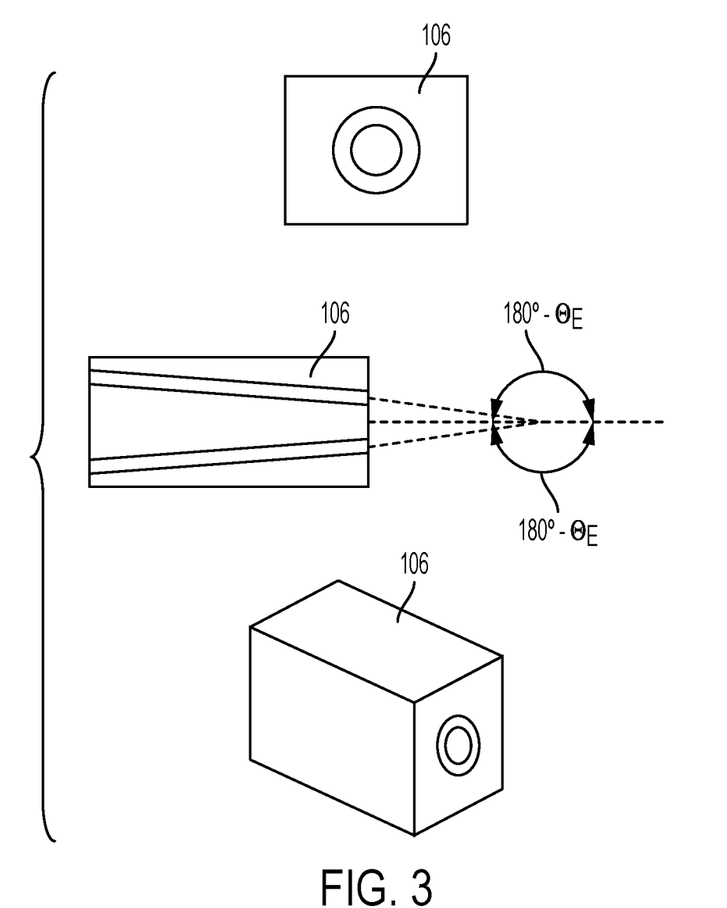
FIG. 3 is a schematic illustration of an example collimator that may be used in an apparatus for high resolution PET imaging.

For convenience, an axis may be defined between the detectors 104, 108, with the first detector 104 being positioned at 00. The example first collimator 102 is shown in FIG. 2B (side view, with passage indicated by dashed lines). The first collimator 102 may have a substantially straight passage for allowing gamma rays at a substantially 0° path to reach the first detector 104. The example second collimator 106 is shown in FIG. 2B (side view, with passages indicated by dashed lines) and FIG. 3 (front view top, cutaway side view middle, isometric view bottom). The second collimator 106 may have an angled annular passage for allowing gamma rays at a path angled away from the axis at close to or substantially equal to 180°-$\theta_E$ to reach the second detector 108.

In some examples, the first and the second collimators 102, 106 may both have angled annular passages that together filter for gamma ray pairs traveling at a predefined range of emission angles. In some examples, one or both of the collimators 102, 106 may have a plurality of passages (e.g., in place of the annular passage shown in FIG. 3) for filtering gamma rays. In some examples, a single collimator with respective passages for the detectors 104, 108 may be used in place of the first and second collimators 102, 106.

In an example embodiment, the apparatus 100 may be controllable in 6 degrees of movement (e.g., with a controllable and/or programmable robotic arm) to position the apparatus 100 about an imaging target (e.g., a patient or an animal model). An example control device 130 that may integrate with or include actuator for movement of the apparatus 100 is shown in FIG. 2D.

FIG. 2C is a schematic illustration of another example detector that may be used in an apparatus for high resolution PET imaging. The apparatus 100 may include an imaging system 116 to receive data signals from the coincidence component 114 to generate and display the high resolution PET images. The imaging system 116 may include a display screen, includes at least one processor, memory, at least one I/O interface, and at least one network interface for receiving the signals from the coincidence component 114. For example, the data from the coincidence events may be used to calculate spatial position of annihilation events and the spatial position of the tracer compound which may be used to generate a 2D or 3D spatial representation for high resolution PET images which may be displayed on the display device of imaging system 116. The apparatus 100 may include a storage device 118 to store data from the coincidence component 114 for access by imaging system 116, or other system.

Figure 2D:
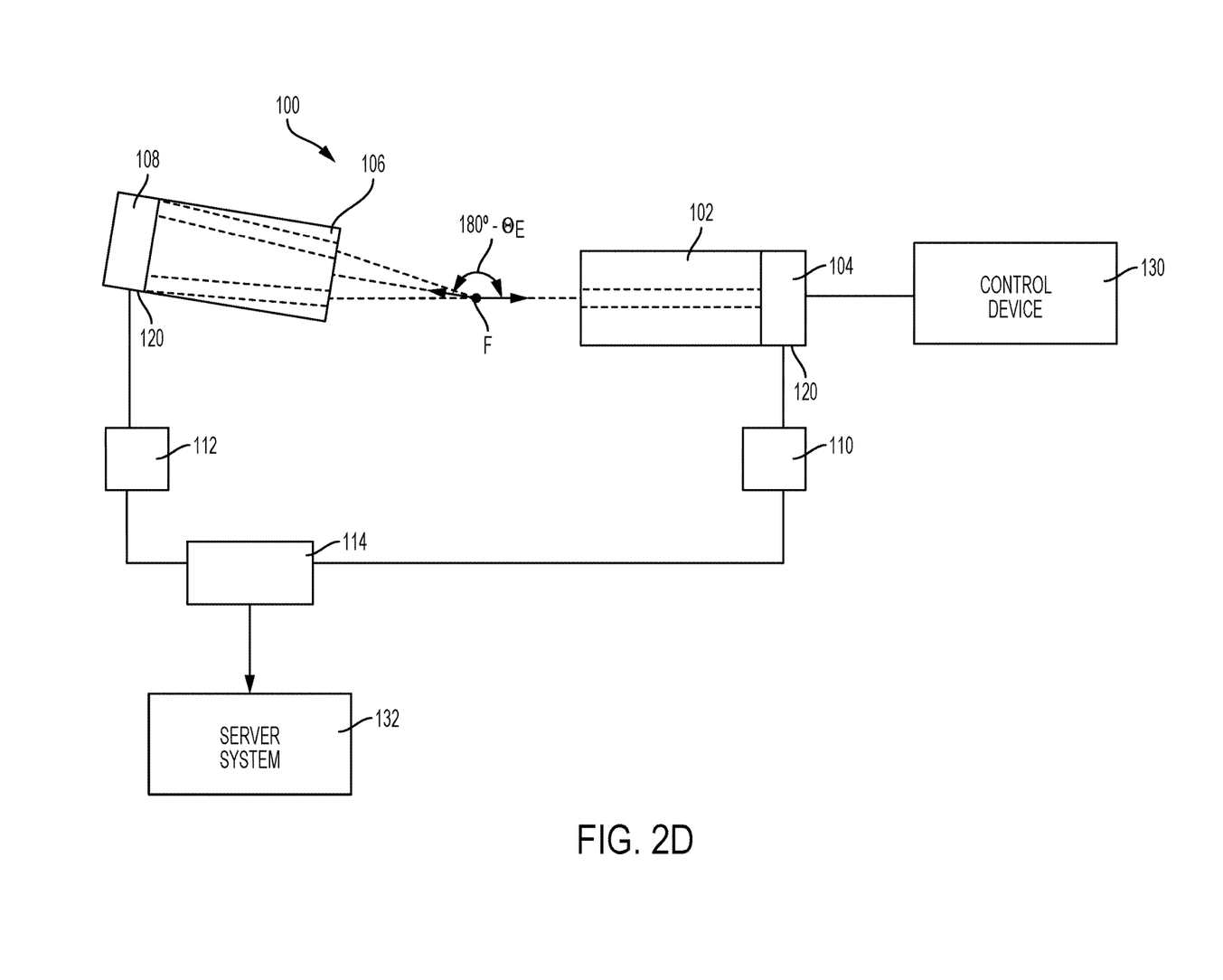
FIG. 2D is a schematic illustration of another example detector that may be used in an apparatus for high resolution PET imaging.

FIG. 2D is a schematic illustration of another example detector that may be used in an apparatus for high resolution PET imaging. The apparatus may include a control device 130 which may include an actuating system to issue control commands to control movement of the detector pairs 120 or other components of apparatus 100. The control device 130 includes at least one processor to generate the control commands, memory, at least one I/O interface, and at least one network interface to transmit the control commands. The control commands may define the nature of the movement. For example, the control device 130 may include or integrate with a controllable and/or programmable robotic arm or other actuator and the control commands may instruct the robotic arm to move to a particular position. The apparatus 100 may be controllable by control device 130 to different degrees of movement to position the apparatus 100 about an imaging target. (e.g., with a controllable and/or programmable robotic arm or other actuator). Detectors 104, 108 may also be controllable by control device 130 to adjust or change the angle with respect to each other. Collimators 102, 106 may also be controllable by control device 130 to adjust or change the angle with respect to each other.

In some examples, the apparatus 100 may dynamically move with respect to the target area based on control commands from the control device 130. In some examples, the control device 130 may include or integrate with a controllable and/or programmable track so that the apparatus 100 may be translatable and movable such as in directions outside of or within the imaging plane. In some examples, alternatively or additionally, control device 130 may enable the apparatus 100 to be rotatable, such as rotating the apparatus 100 to different imaging planes. The ability to move the apparatus 200 (e.g., by translation and/or rotation) may be useful for 3D PET imaging.

The apparatus 100 may include a server system 132 to store and receive data from the coincidence component 114 and other apparatuses connected via a network, for example. The server system may provide access to the stored data by other components of apparatus 100 or other systems (e.g. imaging or display device).

In another example embodiment, an apparatus 200 (FIG. 4B) may include a plurality of detector pairs arranged in a ring configuration, with the target area within the ring, which may allow for simultaneous 360° detection of coincidence events on a 2D plane. Such a configuration may be useful for 2D PET imaging in the plane of the ring. Movement of such a configuration along an axis orthogonal to the imaging plane may also allow for 3D PET imaging. The control device 130 may enable movement along an axis orthogonal to the imaging plane may also allow for 3D PET imaging, for example.

Figure 4A:
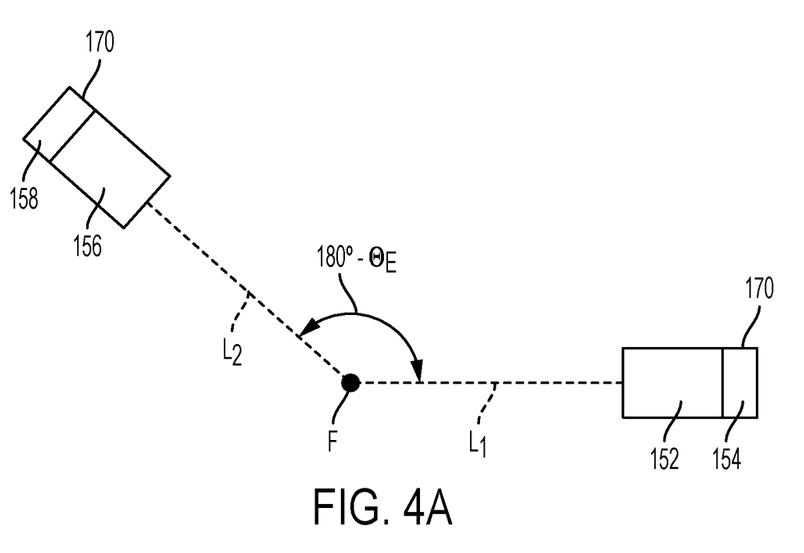
FIG. 4A is a schematic illustration of an example detector configuration that may be used in an apparatus for high resolution PET imaging.

FIG. 4A illustrates another example configuration of a detector pair and respective collimator(s) for detecting a coincidence event at a defined range of emission angles. In this example, a first detector 154 and a second detector 158 define a detector pair 170. Each detector 154, 158 are arranged on opposing sides of a target area F, and each detector 154, 158 defines a respective line-of-sight $l_1$, $l_2$ to the target area F. In this example, the angle between the lines-of-sight is substantially equal to 180°-$\theta_E$. The first and second detectors 154, 158 have respective first and second collimators 152, 156 that filter gamma rays traveling towards the respective first and second detectors 154, 158. The collimators 152, 156 may be configured to filter for gamma ray pairs traveling along the lines-of-sight $l_1$, $l_2$. In this example configuration, the collimators 152, 156 may each have a substantially straight passage for allowing gamma rays traveling along the respective lines-of-sight $l_1$, $l_2$ to reach the respective detectors 154, 158. Such a configuration may be used, with suitable components such as detection component(s) and coincidence component(s), in an apparatus for high resolution PET imaging.

Figure 4B:
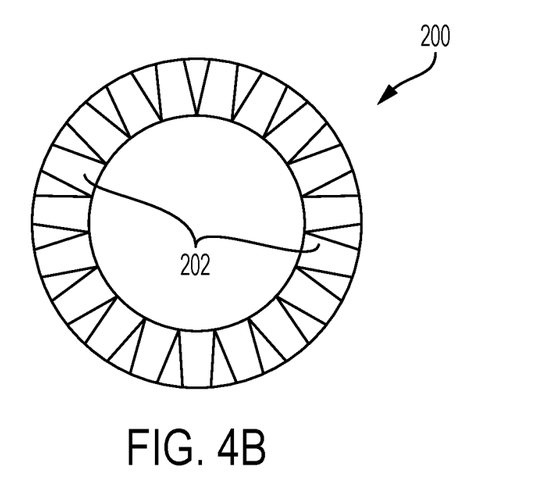
FIG. 4B is a schematic illustration of an example apparatus for high resolution PET imaging having collimators in a ring arrangement.

FIG. 4B shows an example configuration of an apparatus 200 in which detector pairs 202 (e.g., similar to detector pair 120 shown in FIG. 2A or detector pair 170 shown in FIG. 4A) are arranged in a substantially planar ring about a target area. Each member of the detector pair 202 may be positioned on opposing sides of the target area, and configured (e.g., with suitable collimators) to detect gamma ray pairs traveling at a predetermined angle or range of angles (e.g., close or substantially equal to 180°-$\theta_E$). The number of detector pairs 202 in the ring configuration may be varied. For example, there may be 60 equally spaced detector pairs 202, although in other examples there may be more or less detector pairs 202, which may or may not be equally spaced in the ring. The apparatus 200 may be dimensioned to suit the target imaging area. For example, where the apparatus 200 is intended for small animal imaging, the apparatus 200 may have an inner diameter of about 5 cm, an outer diameter of about 15 cm, and a thickness of about 5 cm. The apparatus 200 may be larger (e.g., for human imaging) or smaller.

In some examples, the apparatus 200 may be fixed with respect to the target area. In some examples, the apparatus 200 may be translatable (e.g., using a controllable and/or programmable track), such as in directions outside of or within the imaging plane. In some examples, the apparatus 200 may be alternatively or additionally rotatable (e.g., using a controllable and/or programmable track), such as rotating the apparatus 200 to different imaging planes. The ability to move the apparatus 200 (e.g., by translation and/or rotation) may be useful for 3D PET imaging. The apparatus 200 may couple to a control device 130 (FIG. 2D) that may integrate with or include actuator(s) to trigger movement of apparatus 200 with respect to the target area.

Although not shown, the apparatus 200 may include suitable components (e.g., detection component(s) and coincidence component(s)), which may process signals from the detector pairs 202 to determine coincidence events and to communicate with external processor(s) (e.g., an imaging workstation).

Although the apparatus 200 is illustrated in a ring formation, other configurations may be suitable, including, for example, an arc configuration, a square configuration, a linear configuration, and an irregular configuration. The apparatus 200 may completely surround the target area (e.g., as shown in FIG. 4B), or may only partially surround the target area.

In some examples, each detector may be provided with a respective individual collimator (e.g., as shown in FIGS. 2B and 4B). In other examples, a plurality of detectors may share a collimator. For example, a collimator having a plurality of passages may be used for a respective plurality of detectors.

Figure 5:
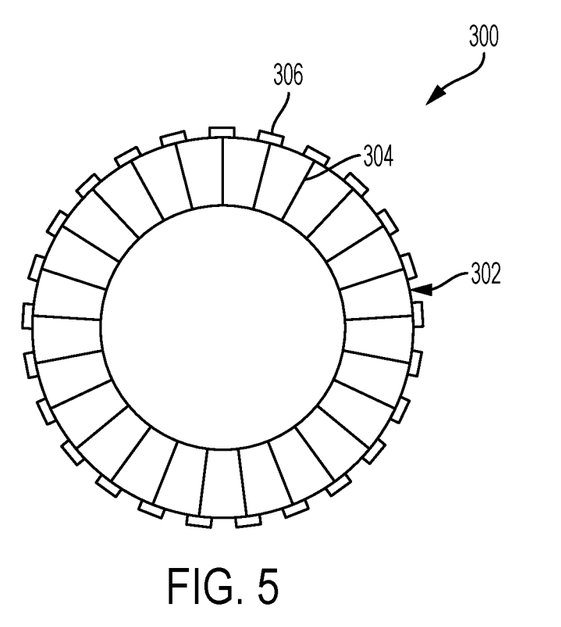
FIG. 5 is a schematic illustration of an example apparatus for high resolution PET imaging having a ring collimator.

FIG. 5 shows an example configuration of an apparatus 300 a collimator 302 has a plurality of passages 304 that filter gamma rays for respective detectors 306. The collimator 302 may be made of a material that blocks gamma rays (e.g., steel or other suitable metal). In some examples, the passage 304 may be formed (e.g., machined) in the collimator 302 as grooves. For example, each groove may have a depth of about 200 μm and a width of about 200 μm. There may be 60 such grooves equally spaced in the collimator 302, although there may be more or less such grooves, which may or may not be equally spaced. The collimator 302 may be dimensioned to suit the target imaging area. For example, for small animal imaging, the collimator 302 may have an inner diameter of about 5 cm and an outer diameter of about 15 cm, and a thickness of about 5 cm. The detectors 306 may be grouped in defined detector pairs, and may be configured, with respective passages 304, to detect gamma ray pairs traveling at a predetermined angle or range of angles (e.g., close or substantially equal to $180°-\theta_E$), for example as shown in FIG. 4A.

Figure 6:
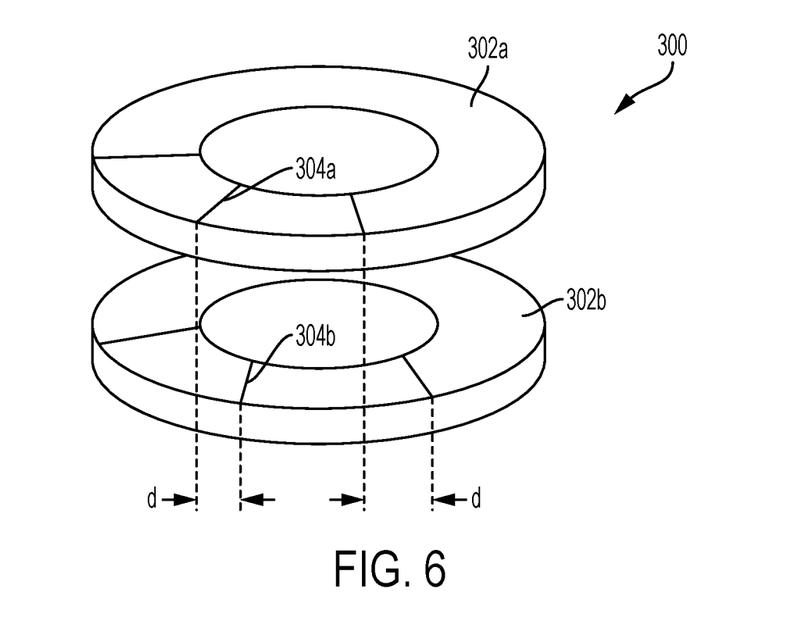
FIG. 6 is an exploded view of an example ring collimator suitable for high resolution PET imaging.
Figure 7:
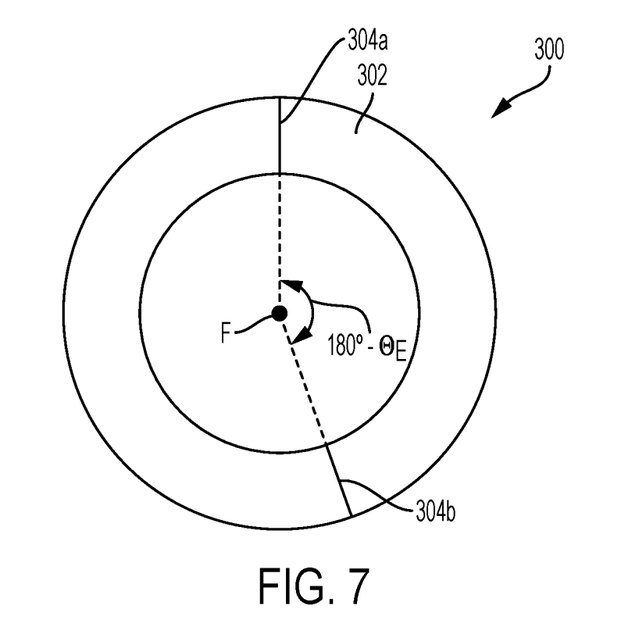
FIG. 7 is a simplified view of an example ring collimator suitable for high resolution PET imaging.

In some examples, two such collimators 302 may be directly superimposed over each other, with a common target area, as shown in FIG. 6, with one collimator 302a being rotationally offset from the other collimator 302b, such that the passages 304a of one collimator 302a are offset from the passages 304b of the other collimator 302b, as indicated by the offset d. This offset may correspond to an angle $\theta_E$ such that the collimators 302a, 302b, when superimposed directly together, configure the passages 304a, 304b of detector pairs at an angle of $180°-\theta_E$, for example as shown in FIG. 7. Note that FIG. 6 and FIG. 7 shown a reduced number of passages 304, 304a, 304b and exaggerated dimensions, for simplicity and clarity. The angle $180°-\theta_E$ may be selected by rotationally offsetting one collimator 302a with respect to the other collimator 302b by the desired angle. Such offset may be predetermined and fixed prior to imaging, or may be controlled during imaging. The collimators 302a, 302b may be fixed in place with each other by suitable fasteners (e.g., screws).

In other example embodiments, instead of two separate collimators 302a, 302b, the passages 304a, 304b may be formed (e.g., by drilling) in a single collimator 302 at the desired angle $180°-\theta_E$.

Although the apparatus 300 is illustrated in a ring formation, other configurations may be suitable, including, for example, an arc configuration, a square configuration, a linear configuration, and an irregular configuration. The apparatus 300 may completely surround the target area (e.g., as shown in FIGS. 5 to 7), or may only partially surround the target area.

In some examples, the apparatus 300 may be fixed with respect to the target area. In some examples, the apparatus 300 may be translatable (e.g., using a controllable and/or programmable track), such as in directions outside of or within the imaging plane. In some examples, the apparatus 300 may be alternatively or additionally rotatable (e.g., using a controllable and/or programmable track), such as rotating the apparatus 300 to different imaging planes. The ability to move the apparatus 300 (e.g., by translation and/or rotation) may be useful for 3D PET imaging.

Although not shown, the apparatus 300 may include suitable components (e.g., detection component(s) and coincidence component(s)), which may process signals from the detectors 306 to determine coincidence events and to communicate with external processor(s) (e.g., an imaging workstation, data storage device).

Figure 8:
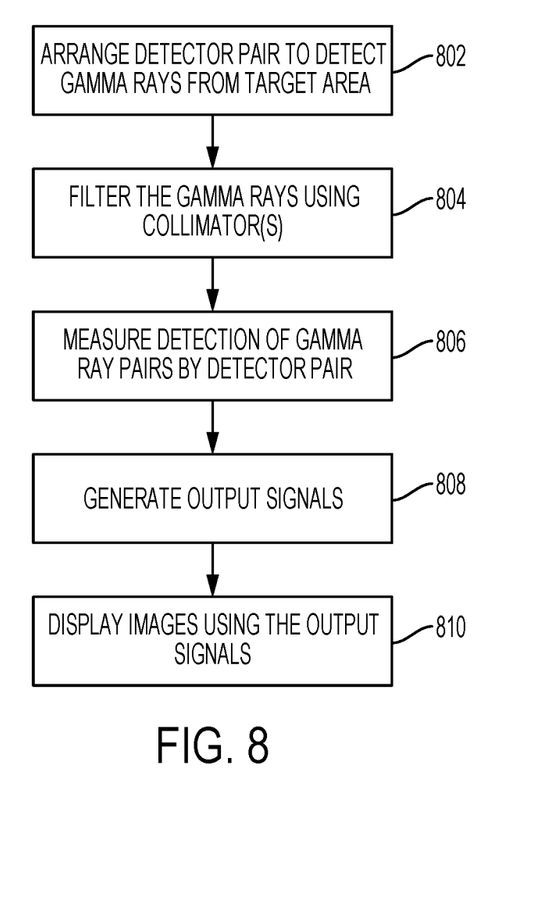
FIG. 8 shows a process for high resolution positron emission tomography (PET) imaging.

FIG. 8 shows a process for high resolution positron emission tomography (PET) imaging.

At 802, at least a first detector and a second detector are arranged to detect gamma rays traveling from a target area, the first detector and the second detector being a detector pair. As noted, control device 130 (FIG. 2D) may use control commands to move the detectors relative to each other and the target area.

At 804, at least one collimator filters gamma rays reaching the first and second detectors. The at least one collimator defines respective passages filtering gamma rays reaching the respective first and second detectors. The passages are defined to filter for only gamma ray pairs traveling from the target area at a predetermined range of angles with respect to each other. The predetermined range of angles is in the range of $180°-\theta_E$, where $\theta_E$ is less than 1° and greater than 0°.

At 806, electrical circuits measure detection of gamma ray pairs substantially coincidentally by the detector pair.

At 808, the electrical circuits generate output signals for the measure detection of gamma ray pairs. For example, the measured detection of gamma ray pairs may be referred to as "coincidence events" and may be used to calculate spatial position of the annihilation events and thus the spatial position of the tracer compound. The spatial positions may be used to generate spatial representations for the high resolution PET images, for example.

At 810, the electrical circuits transmit output signals to an imaging device to display high resolution PET images. The output signals may also be used to dynamically control movement by control device or actuators in example embodiments.

The example apparatuses described above may be useful for providing higher resolution PET imaging as compared to current PET imaging techniques. High resolution PET imaging may be useful for pre-clinical diagnoses, for example to better define the tumor geometry and/or for characterizing microenvironment of tissues and/or for understanding drug delivery in tissues.

The example apparatuses described above may be used in place of or in addition to conventional PET imaging techniques. For example, a conventional PET image may be obtained for the general target area (e.g., general organ of interest) and a high resolution PET image may be obtained for a specific smaller area of interest (e.g., specific tumor within an organ).

The example apparatus may be tuned to detect for annihilation of positrons at selected energy ranges, for example by selecting the angle $180°-\theta_E$ for the detectors and collimators. A larger value of $\theta_E$ may tune the apparatus to detect for annihilation of higher energy positrons. Typically, $\theta_E$ may range from about 0.05° to about 0.5°. Values of $\theta_E$ that are too large (e.g., more than 1°) may exclude all annihilation events from detection and/or may result in erroneous determination of coincidence events.

The example apparatus may have a fixed angle $180°-\theta_E$ (e.g., where the angle $180°-\theta_E$ is selected by the configuration of the passages of the collimators) or the angle $180°-\theta_E$ may be variable, either preset prior to imaging or dynamically changeable during imaging (e.g., where the angle $180°-\theta_E$ is selected by the positioning of detectors in a detector pair). For example, the control device (130) may include or integrate with an actuator to move detectors or collimators to dynamically change the angle during imaging.

The detection of annihilations of positrons having a selected energy range (e.g., only high energy positrons) may decrease the number of coincidence events, which may result in a longer imaging time (e.g., up to 1 hour). Other techniques for reducing noise and/or increasing sensitivity may help to decrease the imaging time.

While the present disclosure refers to certain example tracer compounds and certain example energies, it should be understood that different tracer compounds and different energy ranges may be used. For example, different tracer compounds may have different maximum energies than that described above. Although certain collimator and detector configurations have been described, it should be understood that variations are possible, including other planar or non-planar, 2D or 3D configurations of multiple detector pairs.

The embodiments of the present disclosure described above are intended to be examples only. Alterations, modifications and variations to the disclosure may be made without departing from the intended scope of the present disclosure. In particular, selected features from one or more of the above-described embodiments may be combined to create alternative embodiments not explicitly described. All values and sub-ranges within disclosed ranges are also disclosed. The subject matter described herein intends to cover and embrace all suitable changes in technology. All references mentioned are hereby incorporated by reference in their entirety.

The invention claimed is:

1. An apparatus for high resolution positron emission tomography (PET) imaging, the apparatus comprising:
   at least a first detector and a second detector arranged to detect gamma rays traveling from a target area, the first detector and the second detector being a detector pair;
   at least one collimator for filtering gamma rays reaching the first and second detectors; and
   electrical circuits for measuring detection of gamma ray pairs substantially coincidentally by the detector pair;
   wherein the at least one collimator defines respective passages filtering gamma rays reaching the respective first and second detectors, the passages being defined to filter for only gamma ray pairs traveling from the target area at a predetermined range of angles with respect to each other;
   wherein the predetermined range of angles is in the range of $180°-\theta_E$, where $\theta_E$ is less than 1° and greater than 0°.

2. The apparatus of claim 1 wherein the predetermined range of angles corresponds to emission angles of gamma ray pairs produced by annihilation of a high energy positron.

3. The apparatus of claim 1 wherein $\theta_E$ is in the range of about 0.01° to about 0.5°.

4. The apparatus of claim 1 comprising a plurality of detector pairs.

5. The apparatus of claim 4, wherein the plurality of detector pairs are arrange in a ring formation about the target area.

6. The apparatus of claim 1 further comprising a mechanism for positioning and orienting the detector pair about the target area.

7. The apparatus of claim 1 wherein:
   the at least one collimator defines at least a first passage and a second passage for filtering gamma rays reaching the respective first detector and the second detector;
   one of the first passage and the second passage is substantially perpendicular to a detecting surface of the respective detector;
   the other of the first passage and the second passage is substantially at a non-zero angle to a detecting surface of the respective detector; and
   the first and second passages being configured to filter for only gamma ray pairs traveling from the target area at the predetermined range of angles with respect to each other.

8. The apparatus of claim 7 wherein the passage at the non-zero angle to the detecting surface is an annular passage.

9. The apparatus of claim 1 wherein there is a plurality of collimators, each collimator filtering gamma rays for a respective detector.

10. The apparatus of claim 1, wherein:
    there is a plurality of detector pairs; and
    the collimator defines passages respective to each detector in the plurality of detector pairs.

11. The apparatus of claim 10, wherein the collimator at least partially surrounds the target area.

12. The apparatus of claim 10 wherein the collimator comprises a first half superimposed on a second half, each defining a respective plurality of passages, the passages of the first half being rotationally offset from the passages of the second half, in accordance with the predetermined range of angles.

13. The apparatus of claim 1, wherein the electrical circuits generate and transmit signals for the filtered gamma rays for generation of high resolution PET images.

14. The apparatus of claim 1, further comprising an imaging device for display of high resolution PET images using the measured detection of the gamma rays.

15. The apparatus of claim 1, further comprising a control device including or integrating with an actuator to control movement, position or orientation of the apparatus with respect to the target area.

16. The apparatus of claim 1, further comprising a control device including or integrating with an actuator to control movement, position or orientation of the first detector with respect to the second detector or of the second detector with respect to the first detector.

17. The apparatus of claim 1, wherein the predetermined range of angles is either preset prior to imaging or dynamically changeable during imaging by the positioning of the first detector and the second detector in the detector pair.

18. An apparatus for high resolution positron emission tomography (PET) imaging, the apparatus comprising:
    at least a first detector and a second detector arranged to detect gamma rays traveling from a target area, the first detector and the second detector being a detector pair;
    at least one collimator for filtering gamma rays reaching the first and second detectors, the collimator defining passages respective to each of the first and second detectors to exclude gamma rays traveling at substantially non-perpendicular paths towards detecting surfaces of the respective first and second detectors; and
    electrical circuits for measuring detection of gamma ray pairs substantially coincidentally by the detector pair;
    wherein the detector pair is arranged to detect only gamma ray pairs traveling from the target area at a predetermined range of angles with respect to each other;
    wherein the predetermined range of angles is in the range of $180°-\theta_E$, where $\theta_E$ is less than 1° and greater than 0°.

19. The apparatus of claim 13, wherein:
    there is a plurality of detector pairs; and
    the collimator defines passages respective to each detector in the plurality of detector pairs.

20. The apparatus of claim 14, wherein the collimator at least partially surrounds the target area.

21. An apparatus for high resolution positron emission tomography (PET) imaging, the apparatus comprising:
    at least a first detector and a second detector arranged to detect gamma rays traveling from a target area, the first detector and the second detector being a detector pair;

at least one collimator for filtering gamma rays reaching the first and second detectors; and electrical circuits for measuring detection of gamma ray pairs substantially coincidentally by the detector pair;

wherein the at least one collimator defines respective passages filtering gamma rays reaching the respective first and second detectors, the passages being defined to filter for only gamma ray pairs traveling from the target area at a predetermined range of angles with respect to each other;

wherein the predetermined range of angles is in the range of $180°-\theta_E$, where $\theta_E$ is less than 1° and greater than 0°;

a control device for defining position and orientation of the detector pair relative to the target area based on the predetermined range of angles.

* * * * *